United States Patent
Watanabe

(10) Patent No.: US 6,473,477 B2
(45) Date of Patent: *Oct. 29, 2002

(54) DATA SYNCHRONIZING SIGNAL DETECTING DEVICE

(75) Inventor: Yoshiju Watanabe, Kanagawa-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/837,264

(22) Filed: Apr. 19, 2001

(65) Prior Publication Data

US 2001/0022825 A1 Sep. 20, 2001

Related U.S. Application Data

(63) Continuation of application No. 09/570,037, filed on May 12, 2000, which is a continuation of application No. 08/948,942, filed on Oct. 10, 1997, now Pat. No. 6,125,156.

(30) Foreign Application Priority Data

Oct. 11, 1996 (JP) ............................... 8-289188

(51) Int. Cl.[7] ................................. H04L 7/00
(52) U.S. Cl. ..................... 375/368; 375/364; 375/340
(58) Field of Search ................. 375/368, 364, 375/340, 342, 341; 370/514; 369/59, 49

(56) References Cited

U.S. PATENT DOCUMENTS

| | | | |
|---|---|---|---|
| 4,353,130 A | 10/1982 | Carasso et al. | 375/368 |
| 4,398,224 A | 8/1983 | Watanabe | 386/91 |
| 4,747,116 A | * 5/1988 | Yajima et al. | 375/368 |
| 4,937,843 A | 6/1990 | Takemoto | 375/368 |
| 5,331,618 A | 7/1994 | Nagai | 369/59 |
| 5,402,276 A | 3/1995 | Honma et al. | 360/51 |
| 5,590,159 A | 12/1996 | Anderson | 375/340 |
| 5,768,234 A | 6/1998 | Satomura | 369/59 |
| 5,844,920 A | 12/1998 | Zook et al. | 371/40.14 |
| 6,125,156 A | 9/2000 | Watanabe | |

FOREIGN PATENT DOCUMENTS

| | | |
|---|---|---|
| JP | 58169341 | 10/1983 |
| JP | 574051 | 3/1993 |
| JP | 5159462 | 6/1993 |
| JP | 5334810 | 12/1993 |
| JP | 7182786 | 7/1995 |
| JP | 8096312 | 4/1996 |
| JP | 9223365 | 8/1997 |

OTHER PUBLICATIONS

J. Moon, et al, "Maximum Transition Run Codes for data Storage Systems", IEEE Trans. Mag. vol. 32, No. 5, Sep. 1996.

"Rate 16/17 (0,6/6)", IBM Technical Disclosure Bulletin vo. 31, No. 8, Jan. 1989, pp. 21–23.

* cited by examiner

Primary Examiner—Temesghen Ghebretinsae
(74) Attorney, Agent, or Firm—Antonelli, Terry, Stout & Kraus, LLP

(57) ABSTRACT

A data sync signal detecting device for detecting a sync signal having sync signal detection errors. The detecting device applies the output data of a most-likelihood decoder to shift register bit cells. The data is sequentially shifted and held in the bit cells of the shift register. The bit cell outputs are separated into odd-numbered and even-numbered bit string and applied to first and second pattern matching circuits. The odd-numbered bit string is matched with "01001" by a first pattern matching circuit. The even-numbered bit string is matched with "01011" by a second pattern matching circuit. First and second matching results are applied to a coincidence number adder/majority decision circuit. When coincidence occurs, the matching result is "1", and when non-coincidence occurs, the matching result is "0". The coincidence number ad-der/majority decision circuit produces a sync signal detection output when the first or second matching result is "1".

7 Claims, 17 Drawing Sheets

1) DETECTED CODE EXAMPLE → TIME

DETECTED BIT STRING   : 0 0 1 1 0 0 0 1 1
   ODD-NUMBERED BIT STRING  : 0  1  0  0  1   (DETECTED BY 341)
   EVEN-NUMBERED BIT STRING :   0  1  0  1  1 (DETECTED BY 342)

2) DETECTED CODE EXAMPLE WITH ERROR
   (X INDICATES ERROR POSITION)

DETECTED BIT STRING   : 0 1 1 0 0 0 0 1 1 1
   (WITH ERROR)             X  X
   ODD-NUMBERED BIT STRING  : 0  1  0  0  1   (DETECTED BY 341)
   EVEN-NUMBERED BIT STRING :   1  0  0  1  1 (NOT DETECTABLE BY 342)
   (WITH ERROR)             X  X

1) DETECTED CODE EXAMPLE

DETECTED BIT STRING     : 0 0 1 1 0 0 0 1 1 1 1 1
   ODD-NUMBERED BIT STRING : 0  1  0  0  1  1  (DETECTED BY 441)
   EVEN-NUMBERED BIT STRING :   0  1  0  1  1  1 (DETECTED BY 442)

2) DETECTED CODE EXAMPLE WITH ERROR
   (X INDICATES ERROR POSITION)

DETECTED BIT STRING     : 0 0 1 1 0 0 1 1 0 1 1 1
   (WITH ERROR)                    X   X
   ODD-NUMBERED BIT STRING : 0  1  0  1  0  1  (UNDETECTABLE BY 441)
   (WITH ERROR)                        X   X
   EVEN-NUMBERED BIT STRING :   0  1  0  1  1  1 (DETECTABLE BY 442)

FIG. 5

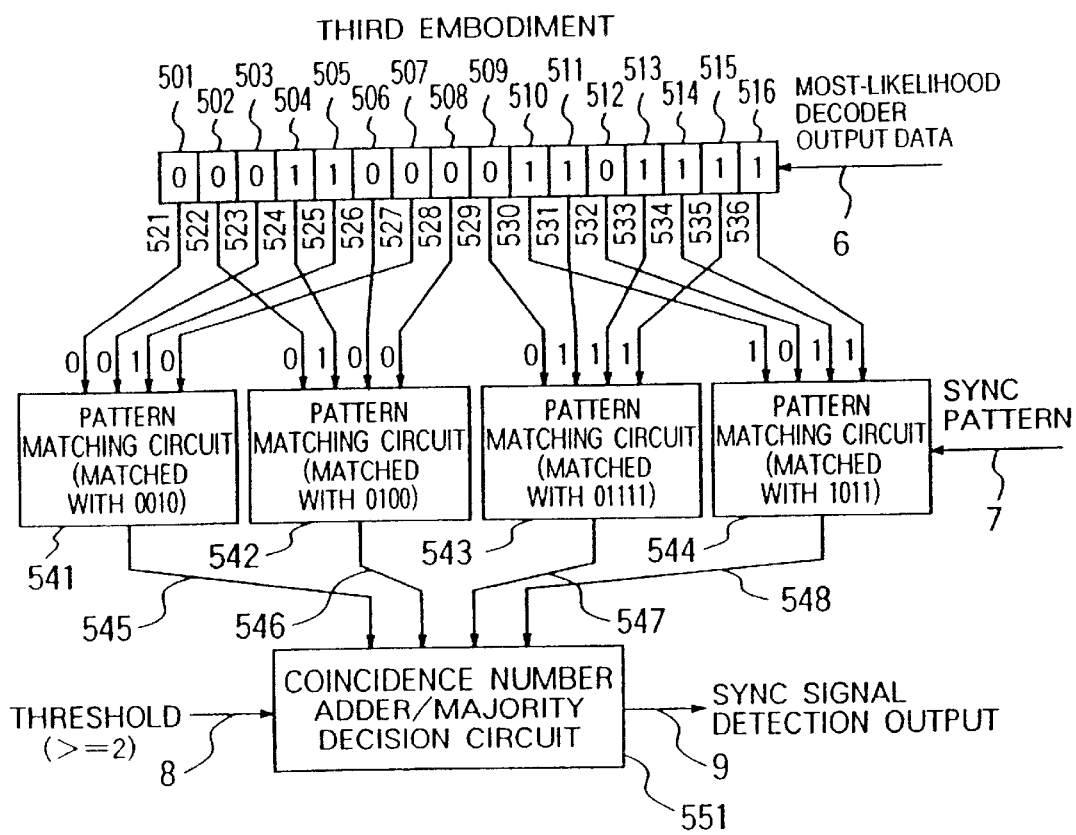

1) DETECTED CODE EXAMPLE

| | | |
|---|---|---|
| DETECTED BIT STRING | : 0 0 0 1 1 0 0 0 0 1 1 0 1 1 1 1 | |
| ODD-NUMBERED BIT STRING 1 | : 0 0 1 0 | (DETECTED BY 541) |
| ODD-NUMBERED BIT STRING 2 | :         0 1 1 1 | (DETECTED BY 543) |
| EVEN-NUMBERED BIT STRING 1 | : 0 1 0 0 | (DETECTED BY 542) |
| EVEN-NUMBERED BIT STRING 2 | :         1 0 1 1 | (DETECTED BY 544) |

2) DETECTED CODE EXAMPLE WITH ERROR
   (X INDICATES ERROR POSITION)

| | | |
|---|---|---|
| DETECTED BIT STRING (WITH ERROR) | : 0 0 0 1 1 0 1 0 1 1 1 0 1 1 1 1<br>              X   X | |
| ODD-NUMBERED BIT STRING 1 (WITH ERROR) | : 0 0 1 1<br>        X | (UNDETECTABLE BY 541) |
| ODD-NUMBERED BIT STRING 2 (WITH ERROR) | :         1 1 1 1<br>            X | (UNDETECTABLE BY 543) |
| EVEN-NUMBERED BIT STRING 1 | : 0 1 0 0 | (DETECTABLE BY 542) |
| EVEN-NUMBERED BIT STRING 2 | :         1 0 1 1 | (DETECTABLE BY 544) |

FIG. 6

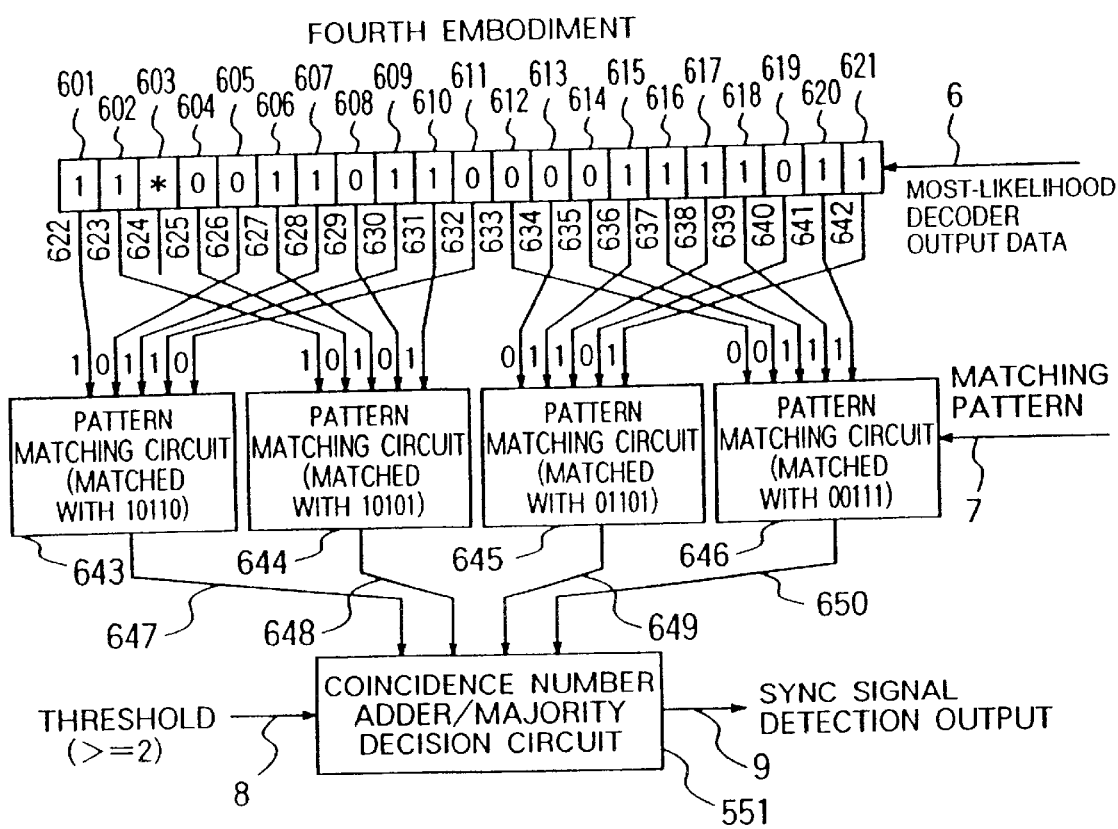

FOURTH EMBODIMENT

1) DETECTED CODE EXAMPLE

| | | |
|---|---|---|
| DETECTED BIT STRING | : 11*001101100001111011 | |
| ODD-NUMBERED BIT STRING 1 | : 1  0  1  1  0 | (DETECTED BY 643) |
| ODD-NUMBERED BIT STRING 2 | :          0  1  1  0  1 | (DETECTED BY 645) |
| EVEN-NUMBERED BIT STRING 1 | : 1  0  1  0  1 | (DETECTED BY 644) |
| EVEN-NUMBERED BIT STRING 2 | :          0  0  1  1  1 | (DETECTED BY 646) |

2) DETECTED CODE EXAMPLE WITH ERROR
   (X INDICATES ERROR POSITION)

| | | |
|---|---|---|
| DETECTED BIT STRING (WITH ERROR) | : 11*001100100101111011<br>         X       X | |
| ODD-NUMBERED BIT STRING 1 (WITH ERROR) | : 1  0  1  0  0<br>         X | (UNDETECTABLE BY 643) |
| ODD-NUMBERED BIT STRING 2 (WITH ERROR) | :          1  1  1  0  1<br>         X | (UNDETECTABLE BY 645) |
| EVEN-NUMBERED BIT STRING 1 | : 1  0  1  0  1 | (DETECTABLE BY 644) |
| EVEN-NUMBERED BIT STRING 2 | :          0  0  1  1  1 | (DETECTABLE BY 646) |

COINCIDENCE NUMBER ADDER/MAJORITY DECISION
CIRCUIT USED FOR THIRD AND FOURTH EMBODIMENTS

TRUTH TABLE FOR THRESHOLD VALUE OF 2

| NO. | 545 (A) | 546 (B) | 545 (C) | 548 (D) | 9 (Z) |
|---|---|---|---|---|---|
| 1 | 0 | 0 | 0 | 0 | 0 |
| 2 | 0 | 0 | 0 | 1 | 0 |
| 3 | 0 | 0 | 1 | 0 | 0 |
| 4 | 0 | 0 | 1 | 1 | 1 |
| 5 | 0 | 1 | 0 | 0 | 0 |
| 6 | 0 | 1 | 0 | 1 | 1 |
| 7 | 0 | 1 | 1 | 0 | 1 |
| 8 | 0 | 1 | 1 | 1 | 1 |
| 9 | 1 | 0 | 0 | 0 | 0 |
| 10 | 1 | 0 | 0 | 1 | 1 |
| 11 | 1 | 0 | 1 | 0 | 1 |
| 12 | 1 | 0 | 1 | 1 | 1 |
| 13 | 1 | 1 | 0 | 0 | 1 |
| 14 | 1 | 1 | 0 | 1 | 1 |
| 15 | 1 | 1 | 1 | 0 | 1 |
| 16 | 1 | 1 | 1 | 1 | 1 |

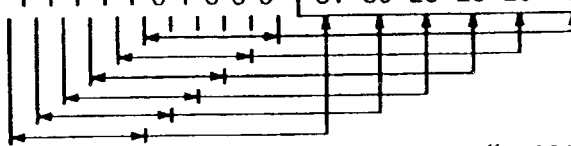
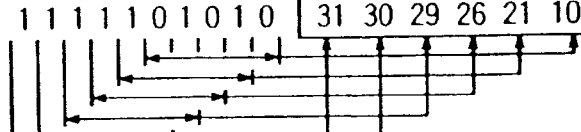

FIG. 12

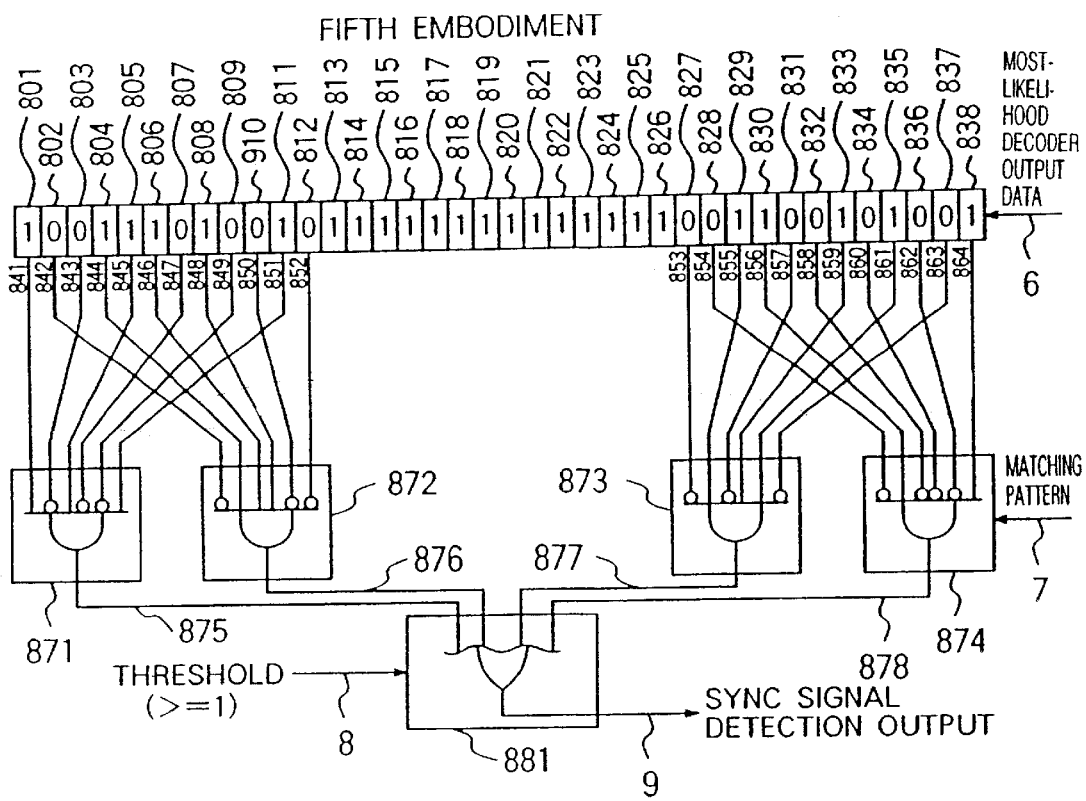

1) DETECTED CODE EXAMPLE

| | | |
|---|---|---|
| DETECTED BIT STRING | : 100111010010111⟨⟩1001100101001 | |
| ODD-NUMBERED BIT STRING 1 | : 1 0 1 0 0 1 | (DETECTED BY 871) |
| ODD-NUMBERED BIT STRING 2 | :                                         0 1 0 1 1 0 | (DETECTED BY 873) |
| EVEN-NUMBERED BIT STRING 1 | : 0 1 1 1 0 0 | (DETECTED BY 872) |
| EVEN-NUMBERED BIT STRING 2 | :                                         0 1 0 0 0 1 | (DETECTED BY 874) |

2) DETECTED CODE EXAMPLE WITH ERROR
(X INDICATES ERROR POSITION FOR DETECTABLE CASES)

DETECTED BIT STRING : 100111010011110⟨⟩1001000100111
(WITH ERROR)                X X      X     XXX

ODD-NUMBERED BIT STRING 1 : 1 0 1 0 0 1        (DETECTABLE BY 871)

ODD-NUMBERED BIT STRING 2 :                   0 1 0 1 0 1   (UNDETECTABLE BY 873)
(WITH ERROR)                                    X X

EVEN-NUMBERED BIT STRING 1 : 0 1 1 1 0 1       (UNDETECTABLE BY 872)
(WITH ERROR)

EVEN-NUMBERED BIT STRING 2 :           X      0 0 0 0 1 1   (UNDETECTABLE BY 874)
(WITH ERROR)                                   X   X

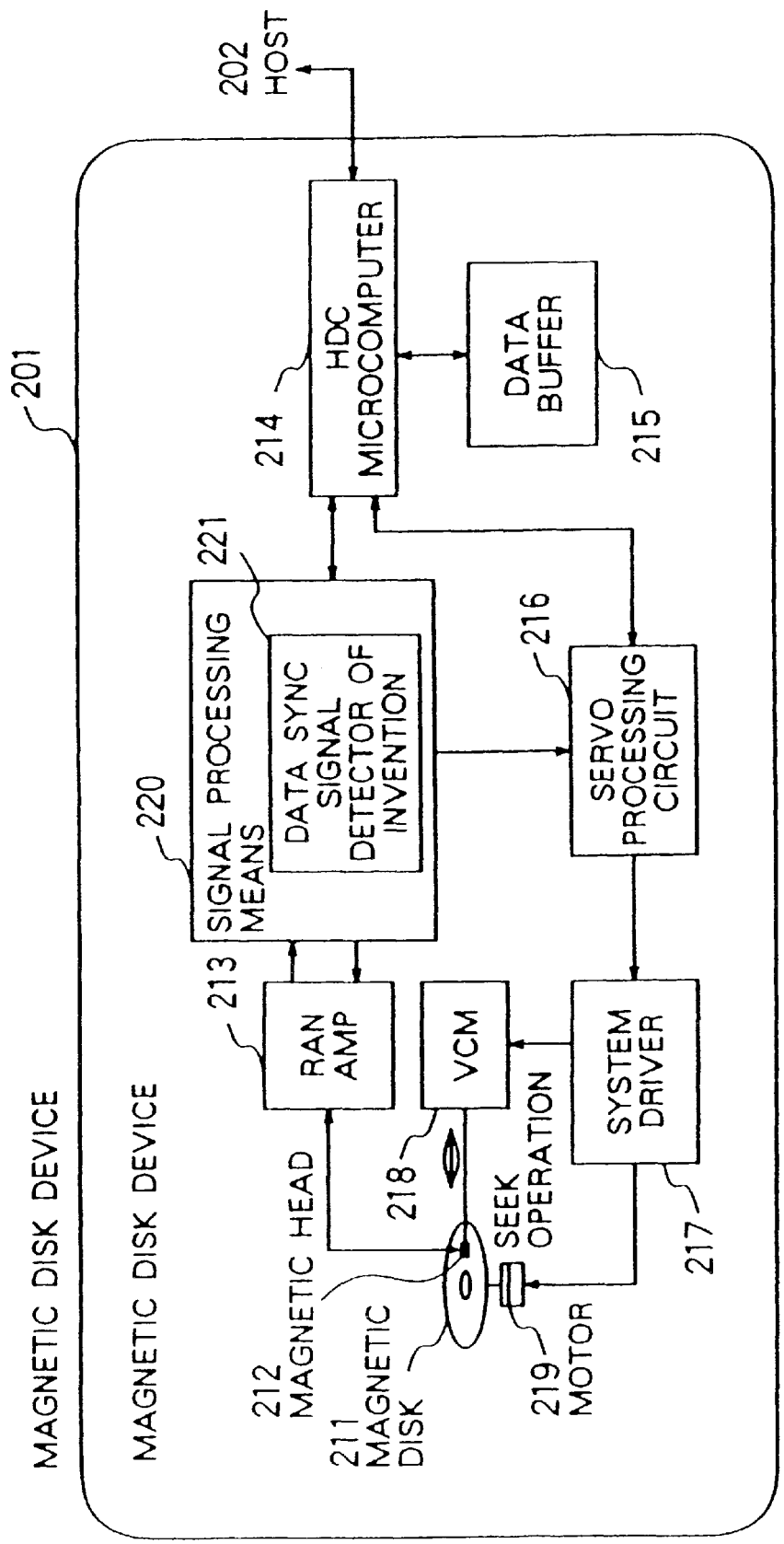

FIG. 16
CODE COMBINATIONS FOR DATA SYNC DETECTION

| ITEM NO. | BIT STRING 1 | BIT STRING 2 | ITEM NO. | BIT STRING 1 | BIT STRING 2 |
|---|---|---|---|---|---|
| 1 | "000010" | "010011" | 45 | "001011" | "100010" |
| 2 | "000010" | "010111" | 46 | "001011" | "101000" |
| 3 | "000010" | "011001" | 47 | "001101" | "100010" |
| 4 | "000010" | "101001" | 48 | "010000" | "010111" |
| 5 | "000010" | "101100" | 49 | "010001" | "010011" |
| 6 | "000010" | "101110" | 50 | "010001" | "010110" |
| 7 | "000100" | "001011" | 51 | "010001" | "011001" |
| 8 | "000100" | "001101" | 52 | "010001" | "011100" |
| 9 | "000100" | "010110" | 53 | "010010" | "010110" |
| 10 | "000100" | "010111" | 54 | "010010" | "010111" |
| 11 | "000100" | "011010" | 55 | "010010" | "011100" |
| 12 | "000100" | "101010" | 56 | "010010" | "101011" |
| 13 | "000100" | "101011" | 57 | "010010" | "101101" |
| 14 | "000100" | "101101" | 58 | "010010" | "101110" |
| 15 | "000100" | "110101" | 59 | "010011" | "010110" |
| 16 | "000101" | "010000" | 60 | "010011" | "010111" |
| 17 | "000101" | "010011" | 61 | "010011" | "011000" |
| 18 | "000101" | "011001" | 62 | "010011" | "011100" |
| 19 | "000101" | "101100" | 63 | "010011" | "101011" |
| 20 | "000110" | "010000" | 64 | "010011" | "101101" |
| 21 | "000110" | "010100" | 65 | "010011" | "101110" |
| 22 | "000110" | "010111" | 66 | "010100" | "011001" |
| 23 | "000110" | "101000" | 67 | "010100" | "011100" |
| 24 | "000110" | "101010" | 68 | "010100" | "101110" |
| 25 | "000110" | "101011" | 69 | "010110" | "011100" |
| 26 | "000110" | "110101" | 70 | "010110" | "101001" |
| 27 | "001000" | "010011" | 71 | "010110" | "101110" |
| 28 | "001000" | "010110" | 72 | "010111" | "011000" |
| 29 | "001000" | "010111" | 73 | "010111" | "011001" |
| 30 | "001000" | "011010" | 74 | "010111" | "101001" |
| 31 | "001000" | "101001" | 75 | "010111" | "101100" |
| 32 | "001000" | "101011" | 76 | "011000" | "101011" |
| 33 | "001000" | "101100" | 77 | "011001" | "101011" |
| 34 | "001000" | "101101" | 78 | "011100" | "101001" |
| 35 | "001000" | "101110" | 79 | "011100" | "101010" |
| 36 | "001000" | "110110" | 80 | "011100" | "101011" |
| 37 | "001010" | "011000" | 81 | "011100" | "110101" |
| 38 | "001010" | "101100" | 82 | "101001" | "101011" |
| 39 | "001010" | "101101" | 83 | "101001" | "101101" |
| 40 | "001010" | "101110" | 84 | "101001" | "101110" |
| 41 | "001010" | "110110" | 85 | "101010" | "101110" |
| 42 | "001011" | "010000" | 86 | "101011" | "101100" |
| 43 | "001011" | "010001" | 87 | "101011" | "101110" |
| 44 | "001011" | "010100" | 88 | "101110" | "110101" |

FIG. 17

CODE COMBINATIONS FOR DATA SYNC DETECTION

| ITEM NO. | ODD NUMBERED BIT STRING 1 | EVEN NUBERED BIT STRING 1 | ODD NUMBERED BIT STRING 2 | EVEN NUBERED BIT STRING 2 |
|---|---|---|---|---|
| 1 | "010011" | "011100" | "001000" | "010110" |
| 2 | "010011" | "011100" | "010110" | "001000" |
| 3 | "011100" | "010011" | "001000" | "010110" |
| 4 | "011100" | "010011" | "010110" | "001000" |
| 5 | "010011" | "011100" | "010001" | "010110" |
| 6 | "010011" | "011100" | "010110" | "010001" |
| 7 | "011100" | "010011" | "010001" | "010110" |
| 8 | "011100" | "010011" | "010110" | "010001" |
| 9 | "001000" | "010011" | "010110" | "101110" |
| 10 | "001000" | "010011" | "101110" | "010110" |
| 11 | "010011" | "001000" | "010110" | "101110" |
| 12 | "010011" | "001000" | "101110" | "010110" |
| 13 | "010011" | "101110" | "001000" | "010110" |
| 14 | "010011" | "101110" | "010110" | "001000" |
| 15 | "101110" | "010011" | "001000" | "010110" |
| 16 | "101110" | "010011" | "010110" | "001000" |
| 17 | "011100" | "101001" | "001000" | "010110" |
| 18 | "011100" | "101001" | "010110" | "001000" |
| 19 | "101001" | "011100" | "001000" | "010110" |
| 20 | "101001" | "011100" | "010110" | "001000" |
| 21 | "011100" | "101001" | "010001" | "010110" |
| 22 | "011100" | "101001" | "010110" | "010001" |
| 23 | "101001" | "011100" | "010001" | "010110" |
| 24 | "101001" | "011100" | "010110" | "010001" |
| 25 | "001000" | "101001" | "010110" | "101110" |
| 26 | "001000" | "101001" | "101110" | "010110" |
| 27 | "101001" | "001000" | "010110" | "101110" |
| 28 | "101001" | "001000" | "101110" | "010110" |
| 29 | "101001" | "101110" | "001000" | "010110" |
| 30 | "101001" | "101110" | "010110" | "001000" |
| 31 | "101110" | "101001" | "001000" | "010110" |
| 32 | "101110" | "101001" | "010110" | "001000" |

FIG. 18

CODE COMBINATIONS FOR DATA SYNC DETECTION

| ITEM NO. | ODD NUMBERED BIT STRING 1 | EVEN NUBERED BIT STRING 1 | ODD NUMBERED BIT STRING 2 | EVEN NUBERED BIT STRING 2 |
|---|---|---|---|---|
| 1 | "0110101" | "0110111" | "0100010" | "0100101" |
| 2 | "0110101" | "0110111" | "0100101" | "0100010" |
| 3 | "0110111" | "0110101" | "0100010" | "0100101" |
| 4 | "0110111" | "0110101" | "0100101" | "0100010" |
| 5 | "0101101" | "0101111" | "1010010" | "0010011" |
| 6 | "0101101" | "0101111" | "0010011" | "1010010" |
| 7 | "01011111" | "0101101" | "1010010" | "0010011" |
| 8 | "01011111" | "0101101" | "0010011" | "1010010" |
| 9 | "0110010" | "0110101" | "0100100" | "1000101" |
| 10 | "0110010" | "0110101" | "1000101" | "0100100" |
| 11 | "0110101" | "0110010" | "0100100" | "1000101" |
| 12 | "0110101" | "0110010" | "1000101" | "0100100" |
| 13 | "0100101" | "0100111" | "1011101" | "0101101" |
| 14 | "0100101" | "0100111" | "0101101" | "1011101" |
| 15 | "0100111" | "0100101" | "1011101" | "0101101" |
| 16 | "0100111" | "0100101" | "0101101" | "1011101" |
| 17 | "0111001" | "1101001" | "0100010" | "0100101" |
| 18 | "0111001" | "1101001" | "0100101" | "0100010" |
| 19 | "1101001" | "0111001" | "0100010" | "0100101" |
| 20 | "1101001" | "0111001" | "0100101" | "0100010" |
| 21 | "0100101" | "0100111" | "1010101" | "1011011" |
| 22 | "0100101" | "0100111" | "1011011" | "1010101" |
| 23 | "0100111" | "0100101" | "1010101" | "1011011" |
| 24 | "0100111" | "0100101" | "1011011" | "1010101" |
| 25 | "0100101" | "0100111" | "1010110" | "1011101" |
| 26 | "0100101" | "0100111" | "1011101" | "1010110" |
| 27 | "0100111" | "0100101" | "1010110" | "1011101" |
| 28 | "0100111" | "0100101" | "1011101" | "1010110" |
| 29 | "0100101" | "0100111" | "1101110" | "1010110" |
| 30 | "0100101" | "0100111" | "1010110" | "1101110" |
| 31 | "0100111" | "0100101" | "1101110" | "1010110" |
| 32 | "0100111" | "0100101" | "1010110" | "1101110" |
| 33 | "0100101" | "0100111" | "1101011" | "1101110" |
| 34 | "0100101" | "0100111" | "1101110" | "1101011" |
| 35 | "0100111" | "0100101" | "1101011" | "1101110" |
| 36 | "0100111" | "0100101" | "1101110" | "1101011" |

DATA SYNCHRONIZING SIGNAL DETECTING DEVICE

This is a continuation of application Ser. No. 09/570,037, filed May 12, 2000; which is a continuation of application Ser. No. 08/948,942, filed Oct. 10, 1997, now U.S. Pat. No. 6,125,156.

BACKGROUND OF THE INVENTION

The present invention generally relates to a signal processing device, and in particular to a data synchronizing (sync) signal detecting device with an improved 5 sync signal detection rate which can detect a sync signal even in the case where a sync signal section has a data discrimination error.

An example of the conventional sync signal detecting device will be explained with reference to FIGS. 9 and 10.

A magnetic disk device is referred to as an example for explaining the prior art.

FIG. 9 shows an example of a recording format of a conventional magnetic disk device.

The data includes an identity (ID) section and a data section for each sector making up a unit storage area. The ID section and the data section each includes a phase-locked oscillator (PLO) sync field 91 for pull-in of a PLL (phase-locked loop), a sync byte (sync signal) 92 for detecting the starting point of the ID (address information) or the data and producing a demodulation timing signal of the code, an ID field for recording /reproducing ID information actually or a data field 93 for recording/reproducing the data, and a cyclic redundancy check (CRC) or an error correcting code (ECC) 94 for detecting or correcting an error.

Also, a gap 95 making up a pattern for absorb-ing various delay times is interposed between the ID section and the data section or between sectors.

It is well known that accurate detection of the sync signal 92 is very important for subsequent code demodulation of the ID and the data field 93.

Specifically, even in the case where the code-demodulated data in the ID or data field 93 has a very satisfactory error rate, an error in detecting the sync signal 92 (which is normally several bytes) will subsequently result in an incorrect code demodulation of several ten to several hundred bytes of the ID or the data field 93. The entire ID or data field 93 may develop an error as a result, thereby causing an extreme deterioration in the overall error rate.

More specifically, a sync signal detection system having a configuration as shown in FIG. 10 equalizes the incoming data 4 by an equalizer 1, and applies an equalized signal 5 to a data sync signal detector, which matches equalized signal 5 with a predetermined sync pattern 12, and if they coincide with each other, a sync signal is detected.

The sync signal detection will fail if the sync signal field 92 develops even a single bit of data error, which will result in an erroneous ID or data field 93. Specifically, if the sync signal field develops a permanent bit drop-off due to a defect of a medium or the like, the data for a sector cannot be correctly reproduced.

In view of this, several methods have been proposed for improving the detection rate of the sync signal.

An example is JP-A-58-169341 which discloses a technique for improving the reliability of sync signal detection in the case where the ratio between data words and code words is 0.5.

This method is considered effective especially when the ratio between data words and code words is 0.5. Due to the low ratio between data words and code words, however, the number of bits of the code actually recorded or reproduced is twice as many as the number of bits of the data. This method, therefore, is disadvantageous with respect to recording density. Further, this method does not include configuration using the high discrimination performance of a Viterbi decoder.

Also, JP-A-5-334810 discloses a technique of improving the reliability of the sync signal detection in the case where the transmission path has a transmission characteristic of partial response type and the sync pattern is coded in blocks.

This technique is intended to achieve highly reliable sync signal detection using multi-Value data as an input to a sync signal detection circuit. This configuration, however, is expected to increase the circuit size.

Further, JP-A-7-182786 discloses a technique for improving the reliability of sync signal detection in the case where the system has a data channel of PR4 (partial response class 4).

This technique is intended to improve the reliability of sync signal detection by adding a pattern with a predicted error to a sync pattern to be matched. This technique is also expected to increase the circuit size due to an increased number of sync patterns to be matched.

The above-mentioned two techniques include a sync signal detection circuit independent of a data discriminator, and therefore the detection performance of the sync signal is determined regardless of the discrimination performance of the data discriminator.

Even when the performance of the data discriminator is improved in the future, therefore, the sync signal detection performance will remain unchanged or rather will be deteriorated relatively.

As a specific example, even though the data discrimination performance can be improved by modifying the configuration of the data discriminator from a Viterbi decoder circuit of PR4 (partial response class 4) to a most-likelihood decoder circuit of EPR4 (expanded partial response class 4), the sync signal detection performance remains unchanged.

The result is that the sync signal detection performance appears to have deteriorated by an amount equivalent to a particular improvement in data discrimination performance.

Another solution may be to use the improvement in the data discrimination performance for improving the recording density and, for this purpose, to use an input signal of a deteriorated quality (such as a lower signal-to-noise ratio). In such a case, however, the sync signal detection performance may appear to have deteriorated by more than an amount equivalent to the improvement in the data discrimination performance.

Assume that the sync signal at the beginning of the data is erroneously detected, or assume, for example, that it cannot be detected at the right position or is detected at a wrong position. Then, the erroneous detection of the sync signal causes an error in the subsequent code demodulation of all the data of several hundred bytes, thereby leading to a technical problem of an extremely deteriorated overall error rate.

SUMMARY OF THE INVENTION

Accordingly, the present invention is required to reduce the detection error of sync signals.

Also, an improved data discrimination performance of a data discriminator may be reflected in a deteriorated sync signal detection performance of a sync signal detector. In such a case, the sync signal detection performance is required to be positively improved with respect to the data discrimination performance.

Further, it is necessary to realize a simple configuration of a sync signal detector with a small circuit size.

The object of the present invention is to solve these problems and to provide a data sync signal detecting device with a small detection error rate.

In order to solve the above-mentioned problems, according to one aspect of the invention, there is provided a data sync signal detecting device for detecting a data sync signal using a bit string of the data output from a data discriminator, comprising means for separating the bit string of the data containing a sync signal detection pattern output from the data discriminator into an odd-numbered bit string and an even-numbered bit string and further separating each of the odd-numbered bit string and the even-numbered bit string into at least one group and outputting the result thereof, matching means associated with each group for matching the output of the group with a corresponding predetermined sync signal pattern and checking for a coincidence, and means supplied with the output of each matching means for detecting a data sync signal in the case where the number of coincident groups is not less than a predetermined threshold value.

According to another aspect of the invention, there is provided a data sync signal detecting device for detecting a sync signal using the bit string of the data output from a data discriminator, comprising means for separating a leading bit string and a bit string following a bit string of an arbitrary pattern of at least one bit of the data containing a sync signal detection pat-tern output from the data discriminator, into an odd-numbered bit string and an even-numbered bit string, and further separating each of the odd-numbered bit string and the even-numbered bit string into at least two groups and outputting the result, matching means associated with each group for matching the output of each group with a corresponding predetermined sync signal pattern and checking for a coincidence, and means for detecting a data sync signal in the case where the number of coincident groups is not less than a predetermined threshold value.

According to still another aspect of the invention, there is provided a data sync signal detecting device wherein a sync signal detection pattern of the bit string of the data containing the sync signal detection pattern output from the data discriminator is configured of a leading bit string and a trailing bit string following another bit string of an arbitrary pattern having at least one bit following the leading bit string, means for separating each of the leading and the trailing bit strings into an odd-numbered bit string and an even-numbered bit string and separating each of the odd-numbered bit string and the even-numbered bit string into at least two groups, odd-number shift means supplied with the odd-numbered bits of the bit string of the data output from the data discriminator and having at least as many stages as the bits of the group, even-number shift means supplied with the even-numbered bits of the bit string of the data output from the data discriminator and having as many stages as the bits of the group, odd-number matching means associated with each of the groups and supplied with the output of each stage of the odd-number shift means for matching the output with a predetermined sync signal pattern corresponding to the particular group and checking for a coincidence, even-number matching means associated with each of the groups and supplied with the output of each stage of the even-number shift means for matching the output with a predetermined sync signal pattern corresponding to the particular group and checking for a coincidence, leading means supplied with the outputs of the odd-number matching means and the even-number matching means of the leading bit string for producing an output in the case where the number of coincident groups is not less than a predetermined threshold value, trailing means supplied with the outputs of the odd-number matching means and the even-number matching means of the trailing bit string for producing an output in the case where the number of coincident groups is not less than a predetermined threshold value, delay means for delaying the output of the leading means, and means for producing a logic sum of the output of the delay means and the output of the trailing means and detecting a data sync signal.

In the data sync detecting device according to the above-mentioned aspects of the invention, the data discriminator is configured as a most-likelihood decoder (a Viterbi decoder).

In the data sync detecting device according to the above-mentioned aspects of the invention, a combination of sync signal detection patterns is used in which the number of groups each having an error at one point and a propagation error at one point and coincident with a sync signal detection pattern before the normal position of the sync signal detection always is smaller than a threshold value for judging the coincidence.

Other objects, features and advantages of the present invention will become apparent from reading the description of the following embodiments of the invention taken in conjunction with the accompanying drawings.

BRIEF DESCRIPTION OF THE DRAWINGS

FIG. 5 is a diagram showing a third embodiment of the invention.

FIG. 6 is a diagram showing a fourth embodiment of the invention.

FIGS. 11A and 11B are diagrams for explaining different sync signal detection patterns used for the invention.

FIG. 12 is a diagram showing a fifth embodiment of the invention.

FIG. 15 is a diagram for explaining a magnetic disk unit according to the invention.

FIG. 16 is a diagram showing code combinations for data sync detection.

FIG. 17 is a diagram showing other code combinations for data sync detection.

FIG. 18 is a diagram showing still other code combinations for data sync detection.

DESCRIPTION OF THE PREFERRED EMBODIMENTS

A basic embodiment showing a basic configuration of a data sync signal detecting device according to the present invention will be described with reference to FIG. 1.

Figure 1:
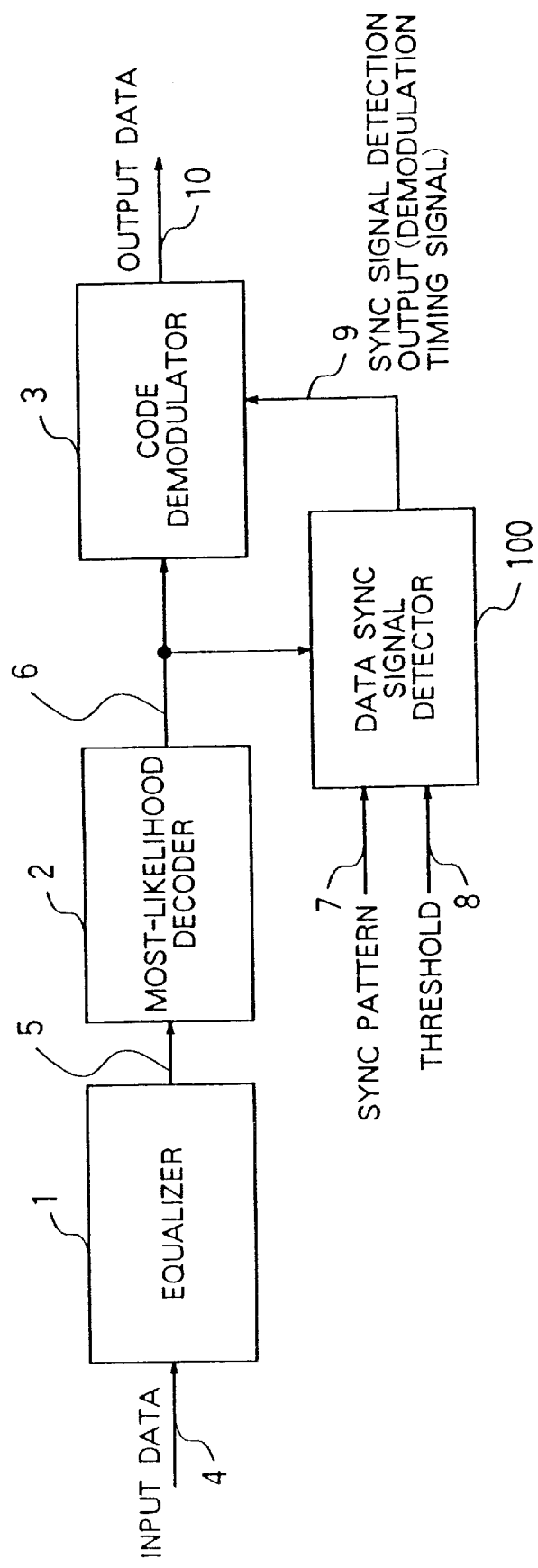
FIG. 1 is a block diagram for explaining a configuration of the present invention.

In the block diagram of FIG. 1, an input data 4 is applied to and equalized in an equalizer 1, and the output of the equalizer 1 is applied to a most-likelihood decoder 2.

The data discriminated by the most-likelihood decoder 2, shown as output 6, is applied to a data sync signal detector 100 and a code demodulator 3. A sync signal detection pattern is used to data sync signal contained in the output 6.

The data sync signal detector 100 matches the discriminated data 6 with a predetermined sync signal pattern (referred to herein as a sync pattern) 7. The result of the matching operation is compared with a predetermined threshold value 8, and if the former is not less than the latter, a sync signal detection output 9 is produced.

The sync signal detection output 9 is applied to the code demodulator 3 to give a demodulation timing of the discriminated data 6. To the extent that the sync signal detection output 9 is produced at a proper timing, the code of the discriminated data 6 is correctly demodulated to produce an output data 10.

Figure 2:
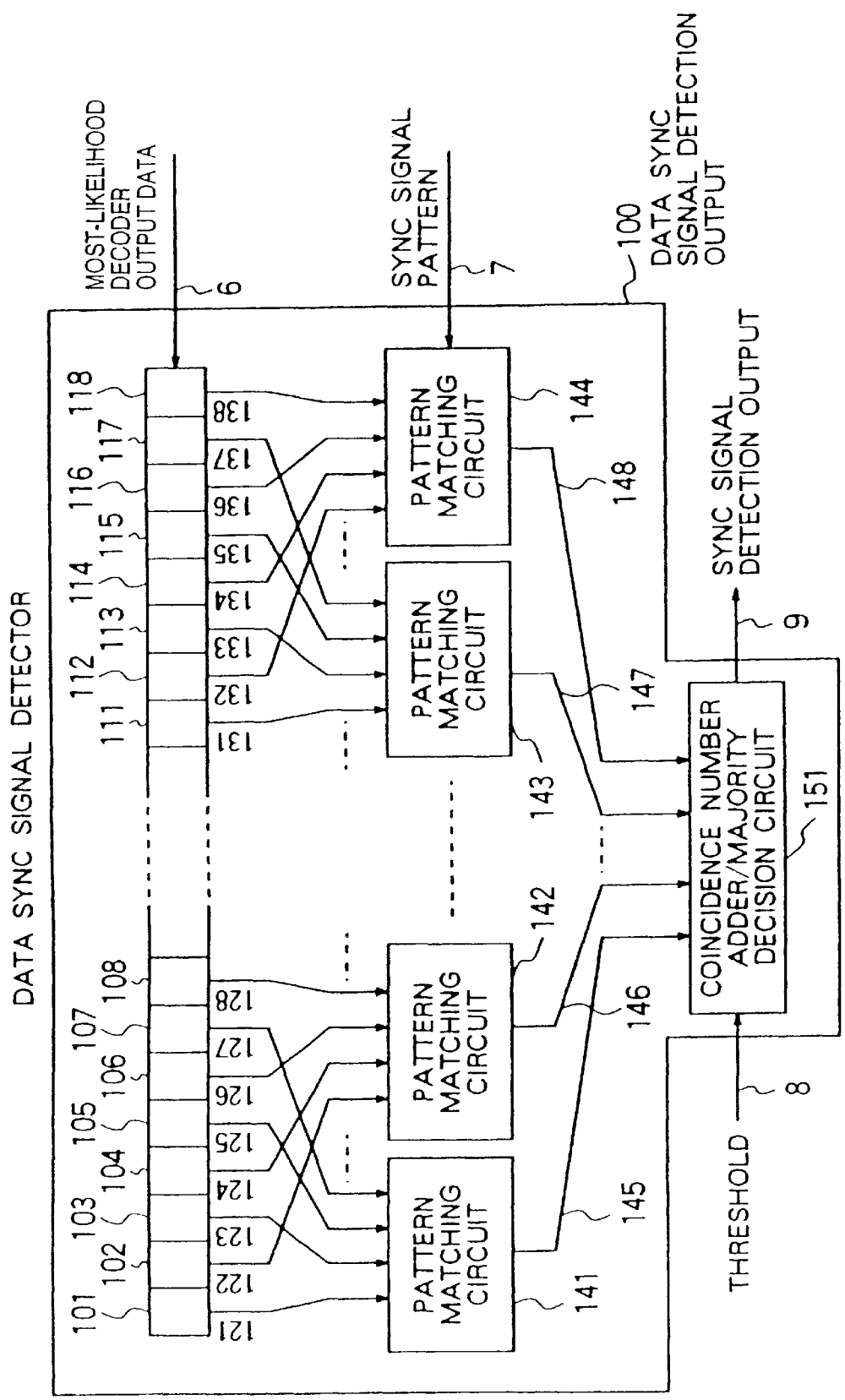
FIG. 2 is a diagram for explaining a basic embodiment of a data sync signal detecting device according to the invention.

A configuration of the data sync signal detector 100 will be described in detail with reference to FIG. 2.

The output data 6 discriminated by the most-likelihood decoder is first applied to a shift register bit cell 118, and then sequentially shifted and held in the shift register bit cells 117 to 101. A sync signal detection pattern is used corresponding to the data sync signal contained in the output data 6.

Bit cell outputs 121 to 138 of the shift register bit cells 101 to 118 are separated into odd-numbered bit strings and even-numbered bit strings and ap-plied to pattern matching circuits 141 to 144.

Specifically, the shift register bit cell outputs 121, 123, 125, 127,—are applied to the pat-tern matching circuit 141; the shift register bit cell outputs 122, 124, 126, 128,—are applied to the pattern matching circuit 142; the shift register bit cell outputs 131, 133, 135, 137 are applied to the pattern matching circuit 143; the shift register bit cell outputs 132, 134, 136, 138 are applied to the pattern matching circuit 144; and so forth. In this way, the bit cell outputs are separated into odd-numbered bit strings and even-numbered bit strings.

A most-likelihood decoder circuit of PR4 (partial response class 4), for example, has a structure interleaved between even-numbered and odd-numbered bit strings. Specifically, the signals of the even-numbered string and the signals of the odd-numbered strings are decoded separately from each other (this feature is also applicable to the channel configuration of EPR4 (expanded partial response class 4)).

In other words, in the case where the discriminated data are separated into the even-numbered bit strings and the odd-numbered bit strings, an error propagation appears only in one of the two types of the strings, but never appears in the other type. Taking note of this fact, the sync signal detection pattern is separated into odd-numbered strings and even-numbered strings.

The pattern matching circuits 141 to 144 each compare and match the signals with a sync pattern, and output the result thereof as signals 145 to 148, respectively.

The result of matching is output as "1" when coincident, for example, and as "0" when not coincident.

The matching results 145 to 148 are applied to a coincidence number adder/majority decision circuit 151 for determining the number of coincidences with the predetermined sync signal pattern and further comparing the resulting number with a predetermined threshold value 8.

In the case where the number of coincidences is not less than the threshold value, a sync signal detection output is produced, while when the number of coincidences is less than the threshold value, no sync signal detection output is produced.

Also, in the configuration of FIG. 1, the output of the most-likelihood decoder 6 is directly input to the code demodulator 3. In spite of this, the input to the code demodulator 3 can be any one of the intermediate signals of the shift register bit cells 121 to 138.

The configuration and operation of a data sync signal detector according to a first embodiment of the invention will be described more specifically with reference to FIG. 3.

In the first embodiment, the total number of groups is 2, the threshold value is 1 and each group is configured of five bits, for example.

The output data 6 of the most-likelihood decoder is applied to the bit cell of the shift register 310 and sequentially shifted and held in the shift register bit cells 309 to 301.

The shift register bit cell outputs 321 to 330 are separated into an odd-numbered string and an even-numbered string input and applied to pattern matching circuits 341 and 342, respectively. In other words, the shift register bit cell outputs 321, 323, 325, 327, 329 of the odd-numbered string are applied to the pattern matching circuit 341, and the shift register bit cell outputs 322, 324, 326, 328, 330 of the even-numbered string are applied to the pattern matching circuit 342.

The odd-numbered string is matched with "01001" as a predetermined sync signal pattern, and a result 343 is output.

The even-numbered string, on the other hand, is matched with "01011" as a predetermined sync signal pattern and a result 344 is output.

The pattern matching circuits 341 and 342 are configured of a simple logic processing circuit. In the case of coincidence, "1" is output and, in the case of non-coincidence, "0" is output. The matching results 343, 344 are applied to the coincidence number adder/majority decision circuit 351.

The result of addition in the coincidence number/majority decision circuit 351 is 0, 1 or 2. Since the threshold value is 1, the sync signal detection output 9 is produced if one of the matching results 343 and 344 is coincident, whereas the sync signal detection output 9 is not output when none of the matching results 343 and 344 is coincident.

Figure 3:
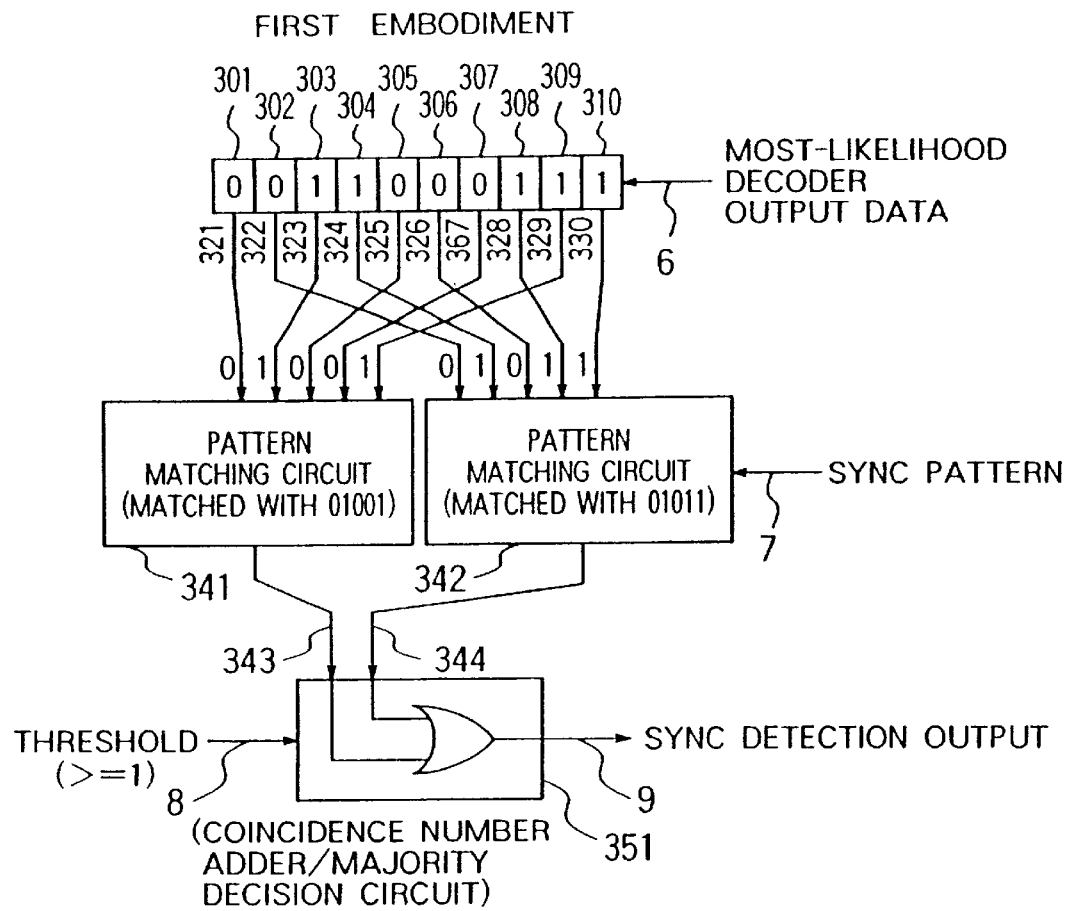
FIG. 3 is a diagram showing a first embodiment of the invention.

Thus, the coincidence number adder/majority decision circuit 351 can be configured as a 2-input OR gate as shown in FIG. 3.

Unless the output data of the sync signal discriminated by the most-likelihood decoder contains an error, as shown in FIG. 3, the sync signal detection output 9 is produced when the value "0011000111" is held as a sync signal detection pattern in the shift register bit cells 301 to 310.

Assume that the channel characteristic is PR4. In the case where the data in the shift register bit cell 302 of the even-numbered string develops an error of "1", for example, the error propagates, often resulting in the fact that the data in the shift register bit cell 304 of the same even-numbered string develops an error of "0".

In this case, the pattern matching result for the even-numbered string fails to coincide.

As for the pattern of the odd-numbered string, however, no propagation error develops and therefore the matching result is coincident.

In this way, strings develops an error, the sync signal detection output 9 can be produced.

Many other patterns exist in which a discrimination error develops. It is seen, however, that the sync signal can be detected in the case where a discrimination error in the sync signal data occurs only in one of the strings.

Now, the sync signal detection pattern used in the first embodiment will be explained with reference to FIG. 11. The pattern attached to the data is called a sync signal detection pattern, and the pattern applied to the pattern matching circuit is called a sync signal 20 pattern.

FIG. 11A shows a sync signal detection pattern associated with a sync signal pattern of "01001", and FIG. 11B shows a sync signal detection pattern associated with a sync signal pattern of "01011".

In this case, the PLO SYNC pattern is "—111—", followed by a sync signal detection pattern.

This diagram shows the case in which the PLO SYNC pattern is five bits and the sync signal detection pattern is five bits for the total of ten bits, and in which a most-frequent single error has occurred.

In FIG. 11A, No. 0 shows an error-free state, and Nos. 1 to 15 the states where an error has occurred. This sync signal detection pattern of "01001" often develops an error.

All of these patterns are shifted while being separated for each 5 bits, which are represented by decimal number as a portion 21 defined by solid line. No sync signal detection pattern (9, in this case) must not appear in this portion 5 other than the normal sync signal detection position. This is in order to set the group of erroneously coincident sync signal detection patterns to 0 in view of the fact that the threshold value is 1.

In this portion 21, the decimal numbers 9 (the pattern involved) and 11 do not exist.

In similar fashion, in FIG. 11B, No. 0 shows an error-free state, and Nos. 1 to 13 show the state where an error has occurred. The sync signal detection pattern "01011" is liable to develop an error.

All these patterns are shifted while being separated for each 5 bits, which are represented by decimal numbers as a portion 22 defined by solid line. No sync signal detection pattern (11 in the present case) must not appear in the portion 22 other than the normal sync signal detection position. This is in order to set the group of erroneously coincident sync signal detection patterns to 0 in view of the fact that the threshold value is 1.

In the portion 22, the decimal numbers 0, 4, 9, 11 (the pattern involved), 12, 23 do not exist.

All of these facts tell that the patterns "01001" and "01011" never coincide with each other or with their own patterns even when a frequent single error occurs.

For this reason, the combination of the sync 10 signal detection pattern "01001" and the sync signal detection pattern "01011" is used as a sync signal detection pattern, so that the pattern "01001" is used as the pattern of an odd-numbered string and the pattern "01011" as the pattern of an even-numbered string. In this way, sync signal detection substantially free of discrimination error is possible.

In this case, the sync signal patterns (sync patterns) used for the pattern matching circuit are "01001" and "01011".

The configuration of two five-bit groups is limited to the above-mentioned combination of the sync signal detection patterns and no other combinations are available.

Figure 8:
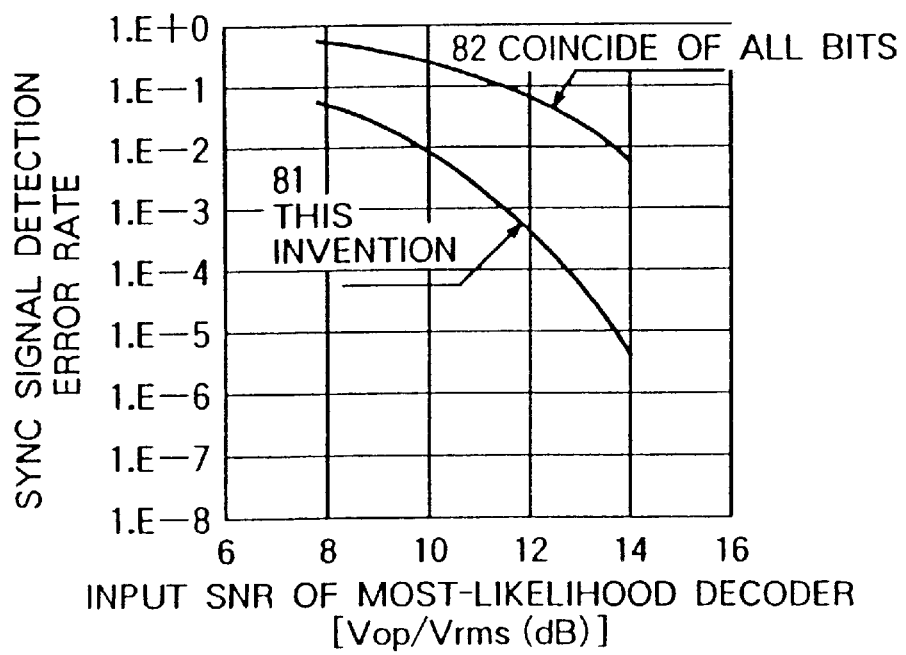
FIG. 8 is a diagram for explaining the effects of the invention.
Figure 9:
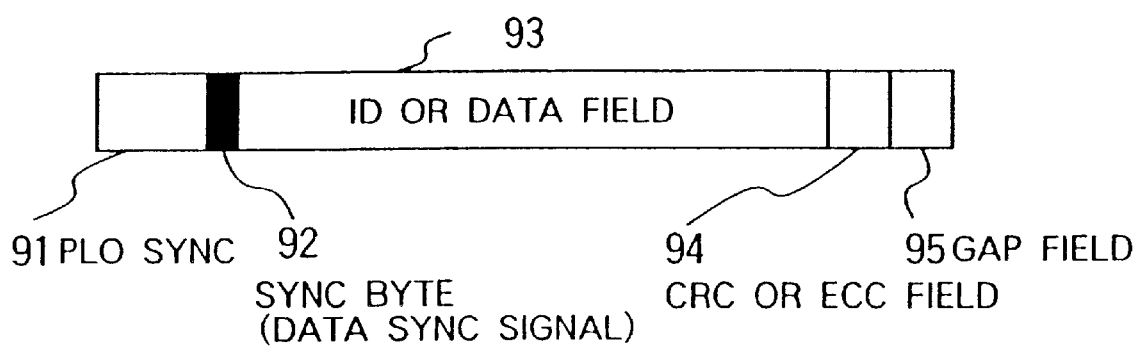
FIG. 9 is a diagram showing a prior art data format.
Figure 10:
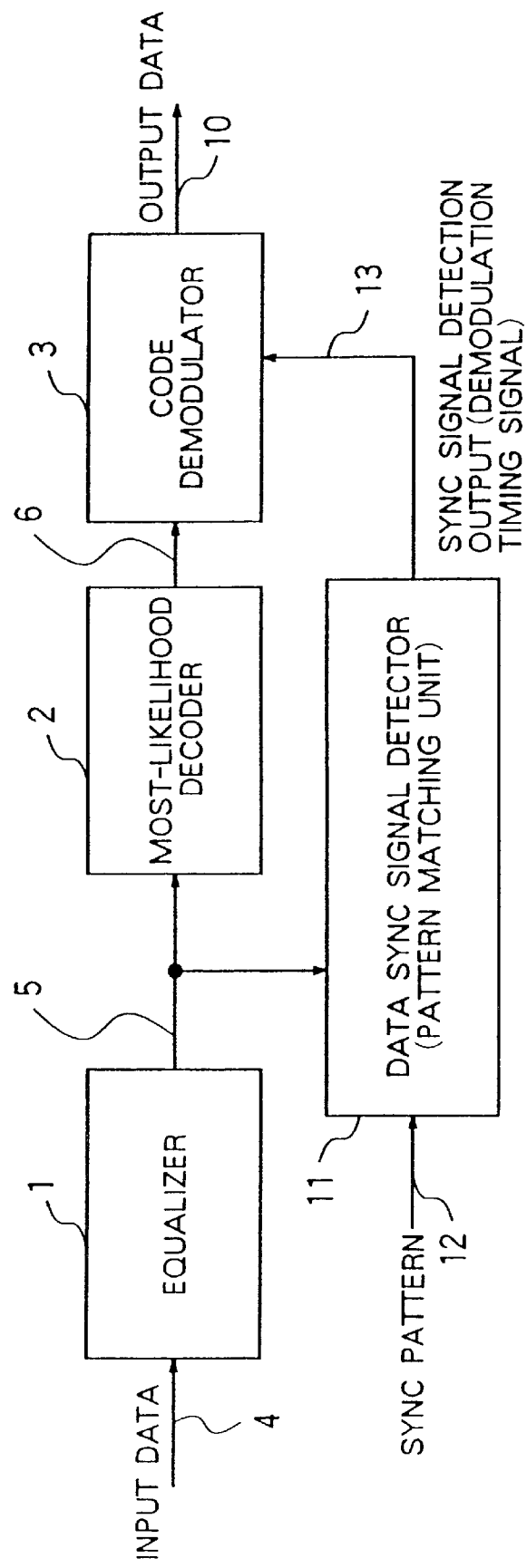
FIG. 10 is a block diagram for explaining a prior art configuration.

The detection performance of this sync signal detection method as confirmed by simulation is shown in the graph of FIG. 8.

In this simulation, a completely equalized waveform free of an equalization error to which white Gaussian noise is added is applied to the equalizer output (input to the most-likelihood decoder) 5 of FIG. 1, and the resulting output 6 of the most-likelihood decoder is applied to the data sync signal detector 100 having the configuration shown in FIG. 3. The resulting sync signal detection output 9 is checked for an error.

The most-likelihood decoder 2 is configured as a most-likelihood decoder of PR4 (partial response class -4).

In the graph of FIG. 8, the abscissa represents SNR (signal-to-noise ratio) of the input to the most-likelihood decoder, and the ordinate represents the error rate of sync signal detection. The formula 1.E+0 represents $10^{-0}$, 1.E−1 represents $10^{-1}$, 1.E−2 represents $10^{-2}$, and so forth. In other words, 1, 0.1, 0.01, 0.001, 0.0001 and so forth are represented in that order from top down.

The result of coincidence between the 10-bit sync signal detection pattern and all the bits (in the 20 case where the bits are not separated into odd and even numbers) is 82, while the figure is 81 according to the present invention.

It is seen from this graph that the improvement is about 3 dB in terms of SNR of the input to the most-likelihood decoder.

In similar manner, a configuration using the pattern combination of "01001" and "01011" as a predetermined sync signal detection pattern is possible, in which when the value "0011001011" different from the case of FIG. 3 is held in the shift register bit cells 301 to 310, the sync signal detection output 9 is produced.

In the process, the pattern matching circuit 341 of the odd-numbered string is matched with the sync pattern "01011", and the result 343 is output. The pattern matching circuit 342 of the even-numbered string, on the other hand, is matched with the sync pattern "01001" and the result 344 is output.

Now, a second embodiment of the invention will be explained with reference to FIG. 4.

The second embodiment concerns an example in which the number of the groups is 2, the threshold value is 1 and each group is configured of 6 bits.

The output data 6 of the most-likelihood decoder is input to a shift register bit cell 412 and shifted and held in the bit cells 411 to 401 sequentially.

The shift register bit cell outputs 421 to 432 are separated into an odd-numbered string and an even-numbered string and input to pattern matching circuits 441 and 442. Specifically, the shift register bit cell outputs 421, 423, 425, 427, 429, 431 of the odd-numbered string are applied to the pattern matching circuit 441, and the shift register bit cell outputs 422, 424, 426, 428, 432 of the even-numbered string are input to the Pattern matching circuit 442.

The odd-numbered string is matched with "010011" as a predetermined sync pattern, and the result 443 thereof is output. The even-numbered string, on the other hand, is matched with "010111" as a predetermined sync pattern and the result 444 thereof is output.

Subsequent operations are similar to those in the first embodiment, in which the matching results 443, 444 are applied to a coincidence number adder/majority decision circuit 451 configured as a two-input OR gate. In the case where one of the matching results 443 and 444 is coincident, a sync signal detection output 9 is produced.

Figure 4:
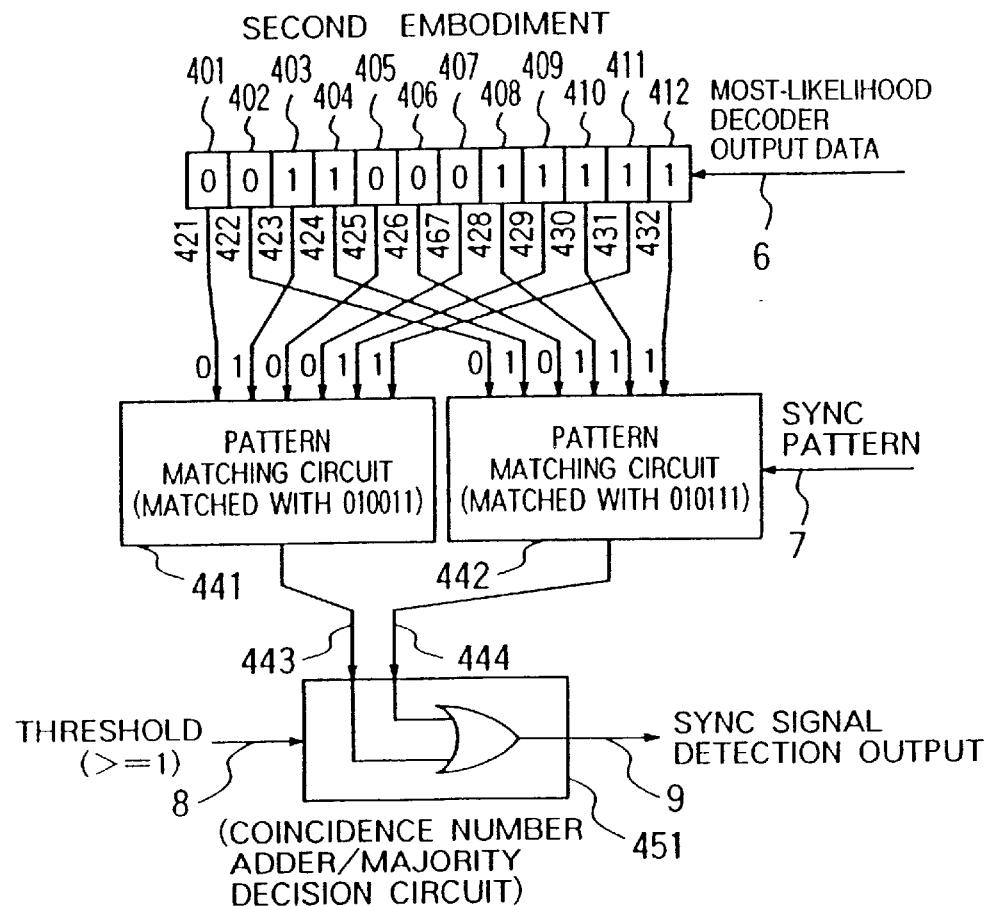
FIG. 4 is a diagram showing a second embodiment of the invention.

Unless the output data of the sync signal discriminated by the most-likelihood decoder has an error, as shown in FIG. 4, the sync signal detection output 9 is produced when the value "001100011111" is held as a sync signal detection pattern in the shift register bit cells 401 to 412.

In this second embodiment, as in the first embodiment, assuming that the data of the shift register bit cell 407 of the odd-numbered string develops an error of "1", the error propagates to such an extent that the data of the shift register bit cell 409 in the same odd-numbered string develops an error of "0". In such a case, the result of pattern matching for the odd-numbered string fails to coincide.

As for the pattern of the even-numbered string, however, no error propagation occurs and therefore the matching result is coincident.

In this way, even when an error occurs in one of the strings, the sync signal detection output 9 can be produced.

As described above, this embodiment also indicates that the sync signal detection is possible even when a discrimination error occurs in the sync signal data.

The sync signal detection capability of the second embodiment is also substantially the same as the corresponding capability in the first embodiment shown in FIG. 8.

The sync signal detection pattern used above can be found in a manner similar to the method described with reference to FIG. 11 in the first embodiment.

According to the second embodiment, as compared with the first embodiment, the number of bits per group is increased and therefore an increased number of patterns can be selected as candidates for the sync signal detection pattern.

More specifically, the 88 combinations shown in FIG. 16 are possible as pattern candidates that can exhibit the performance equivalent to the second embodiment. Also, like in the first embodiment, the patterns can be replaced. Therefore, a total of 176 candidates for the sync signal detection pattern are available. The example described with reference to FIG. 4 is that of the sync signal detection pattern of item No. 60 in FIG. 16.

In this way, the number of candidates for the sync signal detection pattern can be increased by increasing the number of bits per group of the sync signal detection pattern.

Actually, however, a short sync signal detection pattern of course is desired from the viewpoint of format efficiency and circuit scale for internal applications in a signal processing apparatus.

Now, a third embodiment of the invention will be explained with reference to FIG. 5.

This third embodiment concerns a case in which the total number of groups 4, the threshold hold value is 2 and each group is configured of four bits.

The most-likelihood decoder output data 6 is applied to a shift register bit cell 516 and sequentially shifted and held in bit cells 515 to 501. Shift register bit cell outputs 521 to 536 are separated into odd-numbered strings and even-numbered strings and applied to pattern matching circuits 541 to 544.

Specifically, the shift register bit cell outputs 521, 523, 525, 527 of the first-half odd-numbered string are applied to the pattern matching circuit 541, and the shift register bit cell outputs 529, 531, 533, 535 of the last-half odd-numbered string are applied to the pattern matching circuit 543.

The shift register bit cell outputs 522, 524, 526, 528 of the first-half even-numbered string, on the other hand, are applied to the pattern matching circuit 542, and shift register bit cell outputs 530, 532, 534, 536 of the last-half even-numbered string are applied to the pattern matching circuit 544.

In other words, the odd-numbered bit strings 5 are matched with "0010" and "0111" as predetermined sync patterns and the results 545, 547 are output, respectively.

On the other hand, the even-numbered bit strings are matched with "0100" and "1011" as predetermined sync patterns and the results 546, 548 are output, respectively.

As in the first embodiment, in the case where each odd-numbered bit string is coincident with the corresponding sync pattern, "1" is output, and otherwise, "0" is output. The matching results 545 to 548 are applied to a coincidence number adder/majority decision circuit 551.

The result of addition in the coincidence number adder/majority decision circuit 551 is 0, 1, 2, 3 or 4, and the threshold value is 2. As long as any two or more of the matching results 545 to 548 are coincident, therefore, the sync signal detection output 9 is produced, while if the number of coincidences of the matching results 545 to 548 is 0 or 1, on the other hand, the sync signal detection output 9 is not produced.

The sync signal detection pattern used in this case can be found in a manner similar to the method described with reference to the first embodiment in FIG. 11, although the number of groups is 4 and the threshold value is 2 in this embodiment.

As a result, in the case where a most frequent single error occurs, one of the patterns of the four groups can coincide with the sync signal detection pattern before the normal sync signal detection position.

Figure 7:
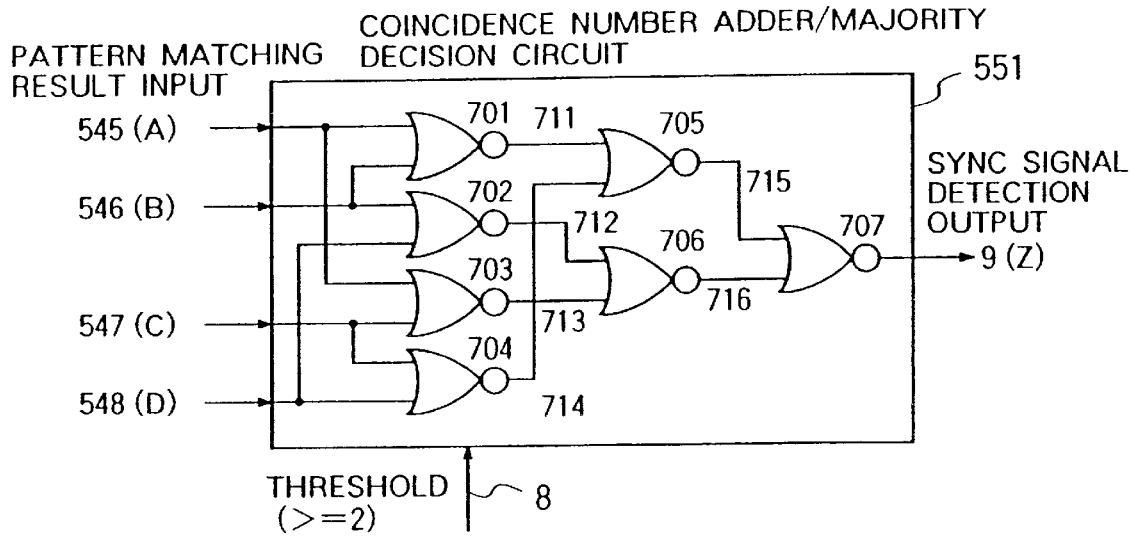
FIG. 7 is a diagram showing a coincidence number adder/majority decision circuit used for the third and fourth embodiments of the invention.

A specific example of a circuit configuration of the coincidence number adder/majority decision circuit 551 is shown in FIG. 7.

The coincidence number adder/majority decision circuit having four inputs and a threshold value of 2 is configured of 7 NOR gates for logic operation.

Unless the output data of the sync signal discriminated by the most-likelihood decoder contains any error, as shown in FIG. 5, the sync signal detection output 9 is produced in the case where the value "0001100001101111" is held as a sync signal detection pattern in the shift register bit cell outputs 501 to 516.

In this third embodiment, like in the first embodiment, assuming that the data of the shift register bit cell 507 of an odd-numbered string develops an error of "1", for example, the particular error propagates so that the shift register bit cell 509 of the same string develops an error of "1".

In that case, the pattern matching results of the two-odd-numbered strings both fail to coincide. As for the patterns of the even-numbered strings, however, no error propagation occurs, and therefore, the matching results are coincident.

Thus, even when an error occurs in one of the strings, the sync signal detection output 9 can be output.

As described above, it is seen that the sync signal detection is possible according to this embodiment even in the case where a discrimination error occurs in the sync signal data.

The detection capability of the sync signal according to this embodiment is substantially the same as that according to the first embodiment.

Also, the present embodiment is applicable with equal effect to other codes using the patterns of "0010", "0111", "0100" and "1011" as a predetermined sync signal detection pattern.

For example, an arrangement can be made to produce the sync signal detection output 9 when the value "0010010010011111" is held in the shift register bit cells 501 to 516 as a sync signal detection pattern different from the case of FIG. 5. The performance in this case remains substantially unchanged.

It is thus possible to select a code relevant to the characteristic of the signal processing system employed.

Now, a fourth embodiment of the invention will be explained with reference to FIG. 6.

This fourth embodiment concerns an example in which the total number of groups is 4, the threshold value is 2 and each group is configured of 5 bits.

The most-likelihood decoder output data 6 is applied to a shift register bit cell 621 and sequentially shifted and held in bit cells 620 to 601.

The shift register bit cell outputs 622 to 642 are separated into odd-numbered strings and even-numbered strings and applied to pattern matching circuits 643 to 646.

Specifically, the shift register bit cell outputs 622, 626, 628, 630, 632 of the first odd-numbered string are applied to the pattern matching circuit 643, and the shift register bit cell outputs 634, 636, 638, 640, 642 of the last odd-numbered string are applied to the pattern matching circuit 645.

The shift register bit cell outputs 623, 625, 627, 629, 631 of the first even-numbered string are applied to the pattern matching circuit 644, and the shift register bit cell outputs 633, 635, 637, 639, 641 20 of the last even-numbered string are applied to the pattern matching circuit 646.

In other words, the odd-numbered bit cell outputs are matched with "10110" and "01101" predetermined sync patterns (matching patterns) for the odd-numbered strings, and the results 647, 649 thereof are output.

On the other hand, the even-numbered bit cell outputs are matched with "10101" and "00111" as predetermined sync patterns (matching patterns) for the even-numbered strings, and the results 648, 650 thereof are output.

As in the first embodiment, in the case where the sync signal pattern is coincident, "1" is output, while when the sync signal pattern fails to coincide, "0" is output.

The matching results 647 to 650 are applied to the coincidence number adder/majority decision circuit 551.

The same coincidence number adder/majority decision circuit having the same number of input bits of the matching results and the same threshold value as in the third embodiment can be used as the coincidence number adder/majority decision circuit 551.

The result of addition in the coincidence number adder/majority decision circuit 551 is 0, 1, 2, 3 or 4 and the threshold value is 2. once two or more of the matching results 647 to 650 are coincident, therefore, the sync signal detection output 9 is produced, while when the number of coincidences of the matching results 647 to 650 is 0 or 1, on the other hand, the sync signal detection output 9 is not produced.

It should be further noted that the output 624 25 of the shift register bit cell 603 is not matched with the sync pattern.

Unless the output data of the sync signal discriminated by the most-likelihood decoder has any error, as shown in FIG. 6, the sync signal detection output 9 is produced when the value "11*0011011000011111011" is held in the shift register bit cells 601 to 621, where * indicates that the number may be 1 or 0.

In other words, the sync signal detection output 9 can be obtained for either of the patterns "1110011011000011111011" and "1100011011000011111011".

According to the fourth embodiment, as in the first embodiment, in the case where the data in the shift register bit cell 609 of an odd-numbered string develops an error of "0", the particular error propagates, so that the data in the shift register bit cell 613 of the same odd-numbered string develops an error of "1".

In such a case, the pattern matching results of the two odd-numbered strings both fail to coincide. For the patterns of the even-numbered strings, however, no error propagation occurs, and therefore the matching results are coincident.

Thus, the sync signal detection output 9 is produced regardless of which string has developed an error.

As described above, it is seen that sync signal detection is possible even in the case where a discrimination error occurs in the sync signal data.

The sync signal detection capability according to this embodiment is substantially equal to that in the first embodiment shown in FIG. 8.

Also, the present embodiment is applicable with equal effect to other codes using predetermined sync signal detection patterns "10110", "10101", "01101" and 1100111".

For example, it is possible for the sync signal detection output 9 to be produced when the value "11*001101100010110111" different from the case of FIG. 6 is held in the shift register bit cells 601 to 621. The performance in this case remains substantially equal.

In this way, it is possible to select a sync signal detection pattern as a sync signal relevant to the characteristics of the signal processing system involved, and so is it possible not to refer to an intermediate arbitrary bit.

This means that there are many sync signal detection patterns with a similar configuration other than those shown in the embodiments described herein.

In addition to the above-mentioned embodiment, as in the third and fourth embodiments, the following-described five combinations are available as a predetermined sync signal detection pattern in the case where the total number of groups is 4, the threshold value is 2 and each group is configured of 6 bits:

a combination including "001000", "010011", "010110" and "101110", a combination including "001000", "010011", "101011" and "101110", a combination including 1100100011" "010110", "101001" and "101110", a combination including "001000", "101001", "101011" and "101110", and a combination including "010001", "010011", "010110" and 11011100".

Now, a fifth embodiment of the invention will be explained with reference to FIG. 12.

The fifth embodiment refers to the case in which the total number of groups is 4, the threshold value is 1 and each group is configured of 6 bits, and in which the sync signal is separated into two portions which are arranged at a distance from each other.

The most-likelihood decoder output data 6 is input to a shift register bit cell 838, and sequentially shifted and held in shift register bit cells 837 to 801.

Shift register bit cell outputs 841 to 864 are separated into odd-numbered strings and even-numbered strings and applied to pattern matching circuits 871 to 874.

Specifically, the shift register bit cell outputs 841, 843, 845, 847, 849, 851 of an odd-numbered string are applied to the pattern matching circuit 871, while the shift register bit cell outputs 842, 844, 846, 848, 850, 852 of an even-numbered string are applied to the pattern matching circuit 872.

The shift register bit cell outputs 853, 855, 857, 859, 861, 863 in the last odd-numbered string are applied to the pattern matching circuit 873, while the shift-tegister bit cell outputs 854, 856, 858, 860, 862, 864 in-the last even-numbered string are applied to the pattern matching circuit 874.

The odd-numbered strings and the even-numbered strings representing the respective sync signal detection patterns are located seven bits apart from each other, respectively.

The bit cell outputs of the odd-number bit strings are matched with "101001" and "010110" as predetermined sync patterns (matching patterns), and the results 875, 877 thereof are output.

The bit cell outputs of the even-numbered strings, on the other hand, are matched with "011100" and "010001" as predetermined sync patterns (matching pat-terns), and the results 876, 878 are output.

In this case, an AND circuit having a NOT gate in a portion of the input thereto is used as a pattern matching circuit.

As in the first embodiment, in the case where the sync signal pattern is coincident, "1" is output, and when it is not coincident, "0" is output.

The matching results 875 to 878 are applied to a coincidence number adder/majority decision circuit 881. The result of addition in the coincidence number adder/majority decision circuit 881 is 0, 1, 2, 3 or 4. Since the threshold value is 1, the coincidence number adder/majority decision circuit 881 can be a 4-input OR circuit.

In the case where at least one of the matching results 875 to 878 is coincident, the sync signal detection output 9 is produced, while in the case where the number of coincidences of the matching results 875 to 878 is zero, on the other hand, the sync signal detection output 9 is not produced.

In this case, as in the fourth embodiment, the 5 outputs of the shift register bit cells 813 to 826 are not used.

Further, a feature of this embodiment is that the patterns are not matched for a long time length of 14 bits between the first sync signal pattern and the last sync signal pattern.

This is in view of the fact that an error that may occur in the first sync signal pattern propagates always in the portion where no pattern is matched (the time length where no pattern is matched is required to be longer than the length of the error propagation taking the above-mentioned fact into consideration).

As shown in FIG. 12, therefore, three indepen-dent errors that may occur fail to propagate to the other sync signal detection patterns. Sync signal detection is therefore possible having improved detection performance.

Figure 13:
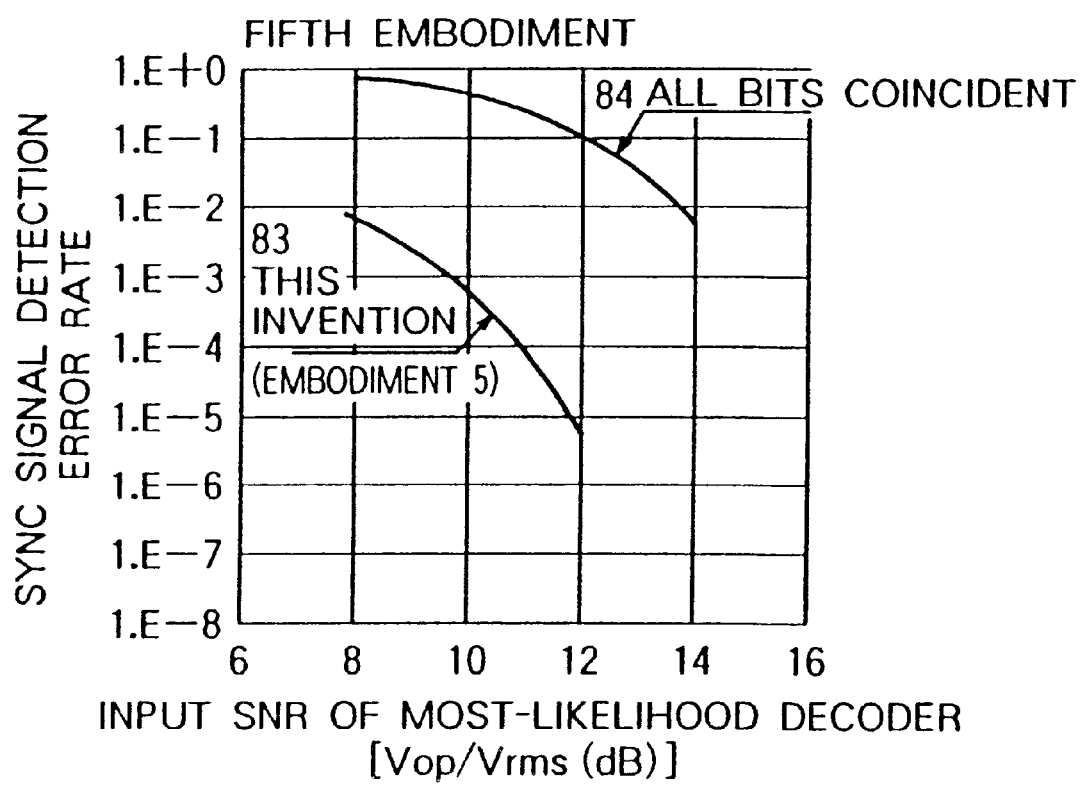
FIG. 13 is a diagram for explaining the effects of the fifth embodiment of the invention.

The result of simulating the effects of the detection performance of the sync signal detection method according to the fifth embodiment is shown in the graph of FIG. 13.

This simulation has been carried out in a manner similar to the first embodiment. A completely equalized waveform free of equalization errors with a white Gaussian noise added thereto is applied to an equaliz-er output (input to a most-likelihood decoder) 5 in FIG. 1. As a result, the output 6 of the most-likelihood decoder is applied to the data sync signal detector 100 configured as shown in FIG. 12, and the resulting sync signal detection output 9 is checked for an error.

The most-likelihood decoder 2 is configured as PR4 (partial response class 4) in this case, too.

In the graph of FIG. 13, the abscissa represents the SNR (signal-to-noise ratio) of the most-likelihood decoder and the ordinate represents the error rate of the sync signal detection.

The result obtained when a 24-bit sync signal pattern coincides with all the bits is 84, while the figure according to this embodiment is 83.

Comparison with FIG. 8 shows that when all the bits are coincident, the sync signal detection error rate is somewhat larger for the result of 84 than that of 83 due to the longer sync signal pattern. The method according to this invention, however, is seen to have improved by about 6 dB in terms of SNR of the most-likelihood decoder input. Also, as compared with the case with 83 in FIG. 8, the improvement is about 2 dB.

The sync signal detection patterns used in this case can be found in a manner similar to the method described with reference to FIG. 11 in the first embodiment, although the number of groups is 4 and the threshold value is 1 in the present embodiment.

As a result, in the case where a highly frequent single error occurs, none of the patterns of the four groups must be coincident before the normal position of sync signal detection.

An example of the patterns retrieved in this way is shown in FIG. 17. This embodiment uses a bit string of item No. 24 in the pattern examples shown in FIG. 17.

In the case where the number of bits of the group for which the sync signal detection pattern is matched is 7, the 36 patterns shown in FIG. 18 are similarly applicable. There are also other patterns available than the sync signal detection patterns shown in this embodiment.

Various configurations are possible in which the number of bits of each group are 8, 9, etc. and the number of groups are 6, 8, etc., for example.

Figure 14:
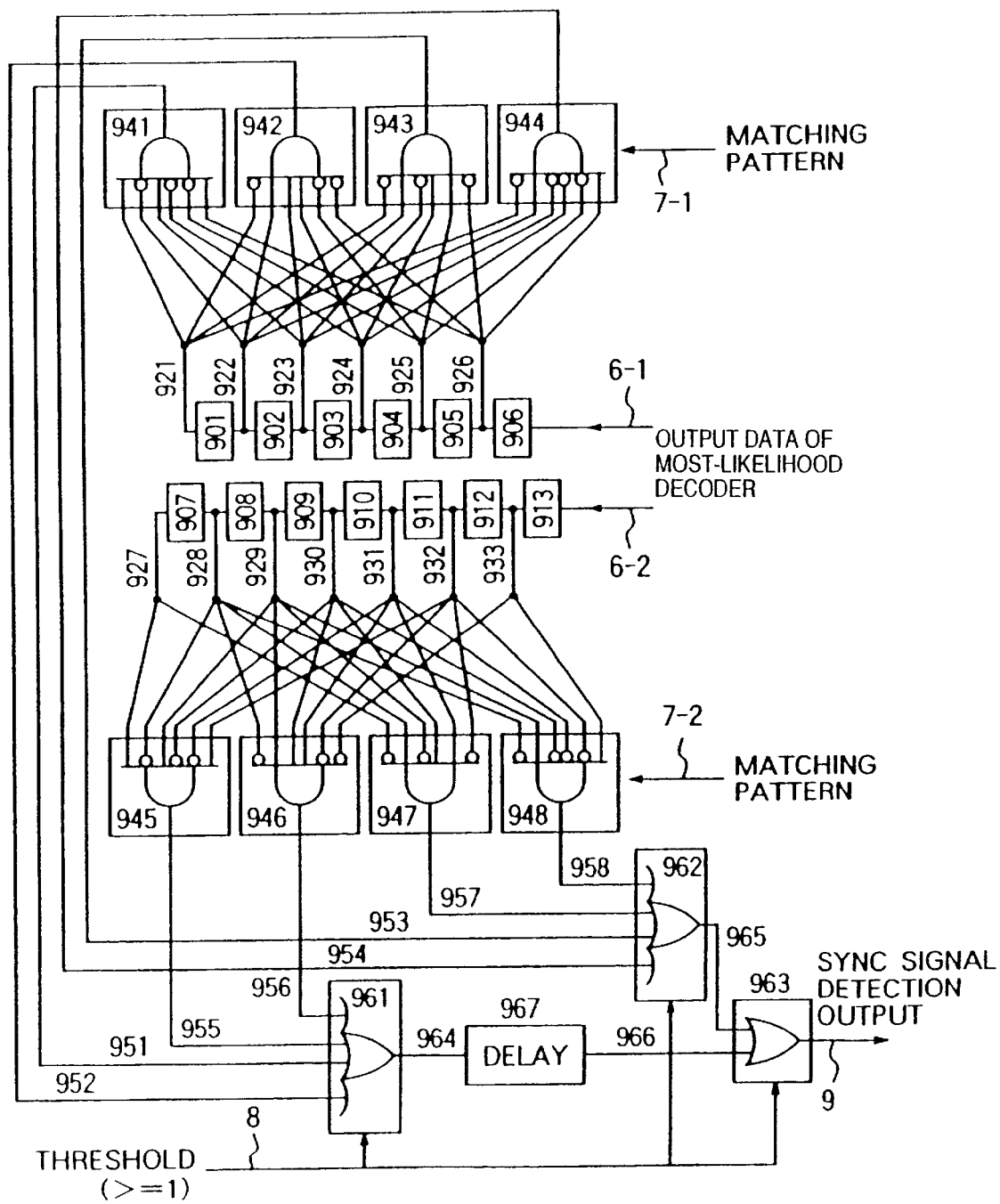
FIG. 14 is a diagram showing another configuration example of the fifth embodiment of the invention.

FIG. 14 is a diagram showing another configuration according to the fifth embodiment of the invention.

The configuration of FIG. 14 has the same function and performance as the embodiment configured in FIG. 14. The operation of the embodiment shown in FIG. 14 will be explained below.

The output data of the most-likelihood decoder is applied by being separated into the data 6-1 for the odd-numbered data strings and the data 6-2 for the even-numbered data strings.

The data can be separated by a distributor or the result of processing the data separated into odd-numbered strings and even-numbered strings within the most-likelihood decoder can be used as they are.

The output data 6-1 of the most-likelihood decoder thus input is sequentially shifted and held in the shift register bit cells 906 to 901 of odd-numbered strings. The output data 6-2 of the most-likelihood decoder, on the other hand, are sequentially shifted and held in the shift register bit cells 913 to 907 of even-numbered strings.

The shift register bit cell outputs 921 to 926 of the odd-numbered strings are matched with four predetermined patterns by pattern matching circuits 941 to 15 944. In similar manner, the shift register bit cell outputs 927 to 933 of the even-numbered strings are matched with four predetermined patterns by pattern matching circuits 945 to 948.

Predetermined patterns (matching patterns), "101001", "011100", "010110" and "010001" are matched for both the odd-numbered strings and the even-numbered strings.

An AND gate having a NOT element in the input portion thereof is also used as a pattern matching circuit.

As in the first embodiment, in the case where the sync signal pattern is coincident, "1" is output, while when the sync signal pattern fails to be coincident, on the other hand, "0" is output.

The pattern matching results 951 to 958 are applied to coincidence number adders/majority decision circuits 961, 962 and 963. Since the threshold value is 1, the coincidence number adders/majority decision circuits 961, 962 can be configured as a 4-input OR gate.

The coincidence number adder/majority decision circuit 961 is supplied with the results 951, 952, 955, of matching with the sync signal patterns "101001", "011100", and the result 964 is output.

The coincidence number adder/majority decision circuit 962 is supplied with the results 953, 954, 957, 958 of matching with the sync signal patterns "010110", "010001", and the result 965 is output.

The sync signal detection patterns "101001" and "011100" are supplied 26 samples earlier than the sync signal detection patterns "010110" and "010001", and therefore the result of matching is also output earlier.

Thus the signal 964 is delayed 26 samples temporally by a delay line 967 and output as signal 966.

The signals 965, 966 are applied to the coin-cidence number adder/majority decision circuit 963 of a 2-input OR circuit. In the case where at least one of the matching results 951 to 958 is coincident, the sync signal detection output 9 is produced, while when the number of coincidence of the matching results 951 to 958 is zero, on the other hand, the sync signal detection output 9 is not produced.

In FIG. 12, there is a 14-bit portion for which no pattern is matched. In FIG. 14, the same func-tion is realized by a delay line 967. Specifically, although the configuration of FIG. 12 utilizes the time lag of the data string input, the configuration of FIG. 14 realizes the same function by delaying one of the matching results.

Also, in view of the fact that it is not known which of the shift register bit cells 906 and 913 is supplied with the first bit of the sync signal pattern, the odd-numbered strings and the even-numbered strings each have four pattern matching circuits.

Assume, for example, that the first bit of the sync signal pattern is applied to the shift register bit cell 906. If there is not any discrimination error, the shift register bit cell 906 is supplied with 1, 0, 1, 0, 0, 1 in that order. In the process, if there is not any discrimination error, the shift register bit cell 913 is supplied with 0, 1, 1, 1, 0. 0 in that order. The patterns are rendered to coincide with each other at the pattern matching circuits 941 and 946 and the matching result "1" is output.

The pattern matching circuits 942 and 945, however, fail to match the patterns. The result is passed thrown the coincidence number adder/majority decision circuit 961 and the delay line 967.

Further, with the lapse of time, the shift register bit cell 906 is supplied with 0, 1, 0, 1, 1, 0 in that order if there is not any discrimination error. At the same time, the shift register bit cell 913 is supplied with 0, 1, 0, 0, 0, 1 in that order in the absence of any discrimination error. The patterns coincide between the pattern matching circuits 943 and 948, and the matching result "1" is output.

The patterns of the pattern matching circuits 944 and 947, however, fail to coincide. The result is passed through the coincidence number adder/majority decision circuit 962.

The signal 965 and the signal 966 output from the delay line are applied to the coincidence number adder/majority decision circuit 963.

As a result, in the case where the first bit of the sync signal detection pattern is applied to the shift register bit cell 906, the sync signal is seen to have been detected from the four pattern matching results of the pattern matching circuits 941, 943, 946, 948.

In similar fashion, in the case where the first bit of the sync signal detection pattern is applied to the shift register bit cell 913, the sync signal is detected by the four pattern matching results of the pattern matching circuits 942, 944, 945, 947.

In this way, the configuration of FIG. 14 requires twice as many pattern matching circuits. Further, this increases the number of the coincidence number adders/majority decision circuits.

In the configuration of FIG. 14, therefore, although the shift registers for data can be deleted, the pattern matching circuits, the coincidence number ad-ders/majority decision circuits and the delay lines are increased in number.

The delay line, however, requires only the matching result that has matched first, and therefore can be realized easily by a counter circuit or the like.

From these facts, in the configuration of FIG. 14, the circuit size and power consumption may be re-duced. It is especially easily understood that this possibility is high when there are many sync signal detection patterns not matched.

This configuration for delaying the matching result shown in FIG. 14 is applicable with equal effect to the first through fourth embodiments. In such a case, the time for which the pattern matching result is delayed is changed in accordance with the pattern length to be matched.

Further, the data sync signal detecting device according to the present invention can of course be used with the signal processing circuit for information processing applications, and external memory units including the magnetic disk unit, the magneto-optic disk unit, the optical disk, the floppy disk device, etc.

FIG. 15 shows a magnetic disk unit using the data sync signal detecting device according to the invention.

A magnetic disk unit 201 includes a magnetic disk 211, a magnetic head 212, a read/write amplifier (R/W amp) 213, a HDC microcomputer 214, a data buffer 215, a servo processing circuit 216, a system driver 217, a voice coil motor (VCM) 218, a motor 219 and a signal processing means 220.

The signal processing means 220 includes a data sync signal detecting device 221 according to the present invention.

The magnetic disk unit 201 having this configuration can realize a magnetic disk unit having a low data sync signal detection error rate.

This invention improves the SNR of the input to the most-likelihood decoder by about 3 to 6 dB and 15 makes it possible to obtain high-accuracy sync information.

Also, it is possible to reduce the data error which otherwise might be caused by the error in the sync information for the signal processing circuit, the information recording/reproducing apparatus, the information transmission apparatus or the like using the sync information.

What is claimed is:

1. A data synchronizing signal detecting device, comprising:
    means for separating a data bit string having a data sync signal detection pattern output from a data discriminator into a corresponding sync signal pattern, a plurality of bits to be compared and a bit not to be compared to produce groups having a predetermined number of bits from said plurality of bits to be compared;

means for comparing each of said groups with said corresponding data sync signal pattern to acquire a coincidence; and means for receiving an output from each of said compare means and detecting a data sync signal when number of coincided groups is equal to or greater than a threshold value, wherein said bit string patterns to be compared are separated into odd-numbered bit strings and even-numbered bit strings to produce said groups from a combination of the odd-numbered bit strings and a combination of the even-numbered bit strings.

2. A data synchronizing signal detecting device, comprising:

means for separating a data bit string having a data sync signal detection pattern output from a data discriminator into a corresponding sync signal pattern, a plurality of bits to be compared and a bit not to be compared to produce groups having a predetermined number of bits from said plurality of bits to be compared;

means for comparing each of said groups with said corresponding data sync signal pattern to acquire a coincidence; and means for receiving an output from each of said compare means and detecting a data sync signal when number of coincided groups is equal to or greater than a threshold value, wherein said data discriminator includes a most-likelihood decoder.

3. A data synchronizing signal detecting device, comprising:

means for separating a data bit string having a data sync signal detection pattern output from a data discriminator into a corresponding sync signal pattern, a plurality of bits to be compared and a bit not to be compared to produce groups having a predetermined number of bits from said plurality of bits to be compared;

means for comparing each of said groups with said corresponding data sync signal pattern to acquire a coincidence; and means for receiving an output from each of said compare means and detecting a data sync signal when a number of coincided groups is equal to or greater than a threshold value, wherein said data discriminator includes a most-likelihood decoder, and wherein said most-likelihood decoder includes a Viterbi decoder.

4. A data synchronizing signal detecting device comprising:

a shift register which shifts and holds data output from a data discriminator;

compare means for comparing a data sync signal detection pattern output from said data discriminator with each data sync signal pattern of groups each having a predetermined number of bits and acquiring a coincidence; and an adder/majority decision circuit which detects a data sync signal when the number of said groups coincided by the comparison in said compare means is equal to or greater than a threshold value, wherein said groups are separated into outputs which are utilized for the comparison of the outputs from said shift register and which are not utilized for the comparison of the outputs therefrom, and bits among the outputs to be utilized for the comparison are further separated into odd-numbered bits and even-numbered bits, and said groups being produced by a combination of the odd-numbered bits and a combination of the even numbered bits.

5. A data synchronizing signal detecting device comprising:

a shift register which shifts and holds data output from a data discriminator;

compare means for comparing a data sync signal detection pattern output from said data discriminator with each data sync signal pattern of groups each having a predetermined number of bits and acquiring a coincidence; and an adder/majority decision circuit which detects a data sync signal when the number of said groups coincided by the comparison in said compare means is equal to or greater than a threshold value, wherein said data discriminator includes a most-likelihood decoder.

6. A data synchronizing signal detecting device comprising:

a shift register which shifts and holds data output from a data discriminator;

compare means for comparing a data sync signal detection pattern output from said data discriminator with each data sync signal pattern of groups each having a predetermined number of bits and acquiring a coincidence; and an adder/majority decision circuit which detects a data sync signal when the number of said groups coincided by the comparison in said compare means is equal to or greater than a threshold value, wherein said data discriminator includes a most-likelihood decoder, and wherein said most-likelihood decoder includes a Viterbi decoder.

7. A data synchronizing signal detecting method comprising the steps of:

separating a data sync detection signal output from a data discriminator into a data sync signal pattern, a plurality of bit string patterns to be compared comparison and a bit string pattern to not be compared;

said plurality of bit string patterns to be compared are divided into a plurality of groups each having a predetermined number of bits;

comparing outputs from said groups with corresponding predetermined data sync signal pattern; and comparing respective results of comparisons and detecting a data sync signal when number of coincided groups is equal to or greater than a threshold value, wherein said bit string patterns to be compared are separated into odd-numbered bit strings and even-numbered bit strings to produce said groups from a combination of the odd-numbered bit strings and a combination of the even-numbered bit strings.

* * * * *